(12) United States Patent
Yano et al.

(10) Patent No.: US 8,850,799 B2
(45) Date of Patent: Oct. 7, 2014

(54) EXHAUST PURIFICATION APPARATUS FOR ENGINE

(71) Applicants: Masakazu Yano, Ageo (JP); Tomofumi Nakashima, Ageo (JP); Tomoyuki Takeda, Ageo (JP); Takafumi Amano, Ageo (JP)

(72) Inventors: Masakazu Yano, Ageo (JP); Tomofumi Nakashima, Ageo (JP); Tomoyuki Takeda, Ageo (JP); Takafumi Amano, Ageo (JP)

(73) Assignee: UD Trucks Corporation, Ageo-shi (JP)

( * ) Notice: Subject to any disclaimer, the term of this patent is extended or adjusted under 35 U.S.C. 154(b) by 40 days.

(21) Appl. No.: 13/646,257

(22) Filed: Oct. 5, 2012

(65) Prior Publication Data
US 2013/0025262 A1  Jan. 31, 2013

Related U.S. Application Data

(63) Continuation of application No. PCT/JP2010/071711, filed on Dec. 3, 2010.

(30) Foreign Application Priority Data

Apr. 7, 2010 (JP) ................. 2010-088543

(51) Int. Cl.
| | | |
|---|---|---|
| *F01N 3/00* | (2006.01) | |
| *B01D 53/94* | (2006.01) | |
| *F02D 41/14* | (2006.01) | |
| *F01N 11/00* | (2006.01) | |
| *F02D 41/22* | (2006.01) | |
| *F02D 41/02* | (2006.01) | |
| *F01N 13/02* | (2010.01) | |
| *F01N 3/20* | (2006.01) | |
| *F01N 3/10* | (2006.01) | |
| *F01N 3/035* | (2006.01) | |

(52) U.S. Cl.
CPC ...... *B01D 53/9477* (2013.01); *F02D 2041/228* (2013.01); *B01D 53/9495* (2013.01); *F02D 41/1459* (2013.01); *F02D 41/028* (2013.01); *F01N 13/02* (2013.01); *F01N 3/2066* (2013.01); *F01N 3/106* (2013.01); *F02D 41/029* (2013.01); *F01N 2900/1812* (2013.01); *F01N 2900/1404* (2013.01); *F01N 11/002* (2013.01); *Y02T 10/47* (2013.01); *F01N 2900/0418* (2013.01); *F01N 3/035* (2013.01); *F02D 41/1446* (2013.01); *F01N 2550/04* (2013.01)
USPC ................. 60/295; 60/301; 60/286

(58) Field of Classification Search
CPC ......... Y02T 10/24; Y02T 10/20; Y02T 10/44; Y02T 10/126; F01N 3/208; F01N 3/2066; F01N 2610/02; F01N 2610/1453; F01N 2610/261; F01N 2610/1406; F01N 2610/10; F01N 2610/14; F01N 2610/1473; B01D 53/9418; B01D 53/96; B01D 2251/2062; B01D 2251/2067
USPC .................... 60/274, 286, 295, 301, 299, 311
See application file for complete search history.

(56) References Cited

U.S. PATENT DOCUMENTS

| | | | |
|---|---|---|---|
| 5,974,791 A * | 11/1999 | Hirota et al. .................... 60/276 |
| 7,207,171 B2 | 4/2007 | Nagaoka et al. | |
| 2005/0050884 A1* | 3/2005 | Nagaoka et al. ............... 60/295 |
| 2005/0153828 A1* | 7/2005 | Uekusa et al. .................. 502/60 |
| 2008/0173011 A1* | 7/2008 | Ruth et al. ...................... 60/295 |
| 2009/0044517 A1* | 2/2009 | Oba ............................... 60/285 |
| 2009/0087364 A1* | 4/2009 | Odajima et al. ........... 423/213.2 |
| 2010/0101213 A1* | 4/2010 | Tuomivaara et al. ........... 60/276 |
| 2010/0212296 A1* | 8/2010 | Iida et al. ......................... 60/285 |
| 2012/0225488 A1* | 9/2012 | Silvis et al. .................... 436/119 |
| 2012/0285139 A1* | 11/2012 | Geyer ............................. 60/274 |
| 2013/0213008 A1* | 8/2013 | Kumar et al. .................... 60/274 |
| 2013/0239553 A1* | 9/2013 | Funk et al. ...................... 60/277 |

FOREIGN PATENT DOCUMENTS

| | | | |
|---|---|---|---|
| CN | 1590727 A | 3/2005 | |
| JP | 9-317447 A | 12/1997 | |
| JP | 09317447 A * | 12/1997 | ............... F01N 3/18 |
| JP | 2003-155918 A | 5/2003 | |
| JP | 2004-084613 A | 3/2004 | |
| JP | 2004084613 A * | 3/2004 | ............... F01N 3/08 |
| JP | 2005-76495 A | 3/2005 | |
| JP | 2008-64074 A | 3/2008 | |
| JP | 2008064074 A * | 3/2008 | |
| JP | 2008-267213 A | 11/2008 | |
| JP | 2008267213 A * | 11/2008 | |
| JP | 2009-191787 A | 8/2009 | |

OTHER PUBLICATIONS

Japanese Office Action, Aug. 6, 2013, 5 pages.
Chinese Office Action, Apr. 1, 2014, 17 pages.
Japanese Office Action, Jun. 3, 2014, 5 pages.

\* cited by examiner

*Primary Examiner* — Thomas Denion
*Assistant Examiner* — Patrick Maines
(74) *Attorney, Agent, or Firm* — Foley & Lardner LLP

(57) ABSTRACT

Based on a fuel supplying amount in accordance with an engine operating condition, a discharge amount of a predetermined fuel component contained in exhaust gas to be discharge per unit time is estimated, and integrated by an accumulation amount of the fuel component accumulated in an exhaust purification element. Furthermore, according to an exhaust gas temperature that flows into the element, an amount of the fuel component to be removed from the element per unit time is estimated, and the amount is subtracted from the accumulation amount. When the accumulation amount is equal to or greater than a predetermined value, a determination is made that a timing to forcefully remove the fuel component accumulated in the element has arrived. Then, an alarming lamp is lightened, and a forceful removing processing is performed by raising a temperature of the exhaust gas above a temperature at which the fuel component is removed.

8 Claims, 3 Drawing Sheets

EXHAUST PURIFICATION APPARATUS FOR ENGINE

CROSS REFERENCE TO RELATED APPLICATIONS

This application is a continuation of PCT/JP2010/071711 filed Dec. 3, 2010, which claims priority to Japanese patent application no. 2010-088543, filed Apr. 7, 2010, the entire contents of which are incorporated herein by reference.

TECHNICAL FIELD

This invention relates to an exhaust purification apparatus for purifying exhaust gas that is exhausted by an engine.

BACKGROUND ART

As an exhaust purification apparatus for purifying exhaust gas that is exhausted by an engine, diesel particulate filters (DPF) adapted to collect and eliminate particulate matters (PM), three-way catalytic converters adapted to simultaneously purify carbon monoxide (CO), hydrocarbon (HC) and nitrogen oxide ($NO_x$), selective catalytic reduction (SCR) converters adapted to purify $NO_x$ with use of reducing agent, and other devices have been put in use. In such an exhaust purification apparatus, the accumulation of, for instance, sulfur components contained in the exhaust gas in an exhaust purification element (e.g., DPF) provided to an exhaust pipe of the engine will cause problems such as degradation of catalysts and increase in exhaust gas pressure. Thus, as is disclosed in Japanese Laid-Open Patent Application Publication No. 2005-76495 (Patent Document 1), a proposal has been made on a technique that: estimates an accumulation amount of sulfur components accumulated in the exhaust purification element based on a fuel consumption amount and a sulfur content percentage of the fuel; and forcefully removes the sulfur components when the estimated amount is equal to or greater than a predetermined amount.

CITATION LIST

Patent Document

Patent Document 1: Japanese Laid-Open Patent Application Publication No. 2005-76495

SUMMARY OF THE INVENTION

Technical Problem

However, such conventional technique has failed to take into account a characteristic that the sulfur components accumulated in the exhaust purification element will be decreased in a region in which a temperature of the exhaust gas is higher than an temperature at which the sulfur components are removed, and thus, the accumulation amount of the sulfur components has been not estimated with high precision. Accordingly, the exhaust purification apparatus may encounter, for instance, a problem that even when the sulfur components have accumulated in the exhaust purification element in an amount greater than or equal to an allowable amount, the sulfur components are not forcefully removed, and may not continuously serve a proper function. The problems described above are not problems peculiar only to the sulfur components (i.e., an example of a fuel component), but can also be likewise caused when, for example, an unburned fuel mainly containing HC is concerned.

Therefore, in view of the above conventional problems and attending to a characteristic that a fuel component is removed according to a temperature of the exhaust gas, the present invention has an object to provide an exhaust purification apparatus with which an accumulation amount of a fuel component accumulated in an exhaust purification element is estimated with high precision.

Solution to Problem

Thus, an exhaust purification apparatus includes: an exhaust purification element provided to an exhaust pipe of the engine; a temperature sensor adapted to measure a temperature of exhaust gas that flows into the exhaust purification element; and a control unit having a built-in computer. In the exhaust purification apparatus, the control unit: estimates a discharge amount of a predetermined fuel component to be discharge per unit time, the predetermined fuel component being contained in the exhaust gas; estimates an amount of the fuel component to be removed from the exhaust purification element per unit time, based on the temperature of the exhaust gas measured by the temperature sensor; and estimates an accumulation amount of the fuel component accumulated in the exhaust purification element, based on the discharge amount and the amount of the fuel component to be removed per unit time.

Advantageous Effects of Invention

The accumulation amount of the fuel component accumulated in the exhaust purification element can be estimated with high precision.

DESCRIPTION OF EMBODIMENTS

Exemplary embodiments according to the aspect of the invention will be described below in details with reference to the attached drawings.

Figure 1:
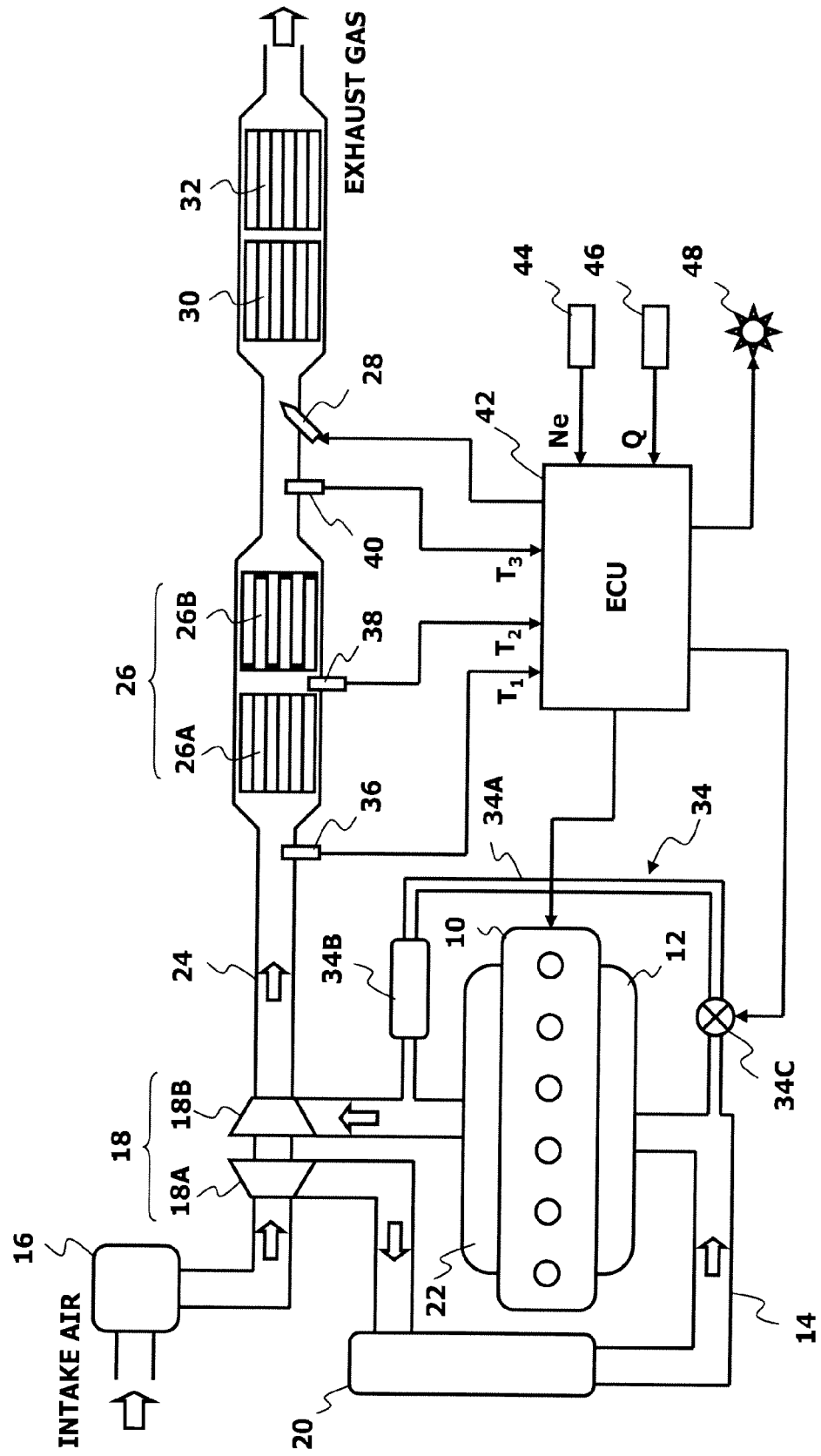
FIG. 1 is an overall arrangement of an exemplary exhaust purification apparatus.

FIG. 1 illustrates an exemplary exhaust purification apparatus.

An intake pipe 14 connected to an intake manifold 12 of a diesel engine 10 is provided with: an air cleaner 16 adapted to filter dusts and the like in the air; a compressor 18A of a turbo charger 18 adapted to supercharge intake air; and an intercooler 20 adapted to cool the intake air that has been heated to a high temperature by passing through the turbo charger 18. The air cleaner 16, the compressor 18A and the intercooler 20 are provided to the intake pipe 14 in this order in a direction in which the intake air flows.

On the other hand, an exhaust pipe 24 connected to an exhaust manifold 22 of the diesel engine 10 is provided with: a turbine 18B of the turbo charger 18; a continuously regenerating DPF device 26; a reducing agent injection device 28 having an injection nozzle for injecting a urea aqueous solution (a precursor of the reducing agent); an SCR converter 30 adapted to selectively reduce and purify $NO_x$ with use of ammonia (reducing agent) generated from the urea aqueous solution; and an oxidation catalyst converter 32 adapted to oxidize the ammonia having passed through the SCR converter 30. The turbine 18B, the continuously regenerating DPF device 26, the reducing agent injection device 28, the SCR converter 30 and the oxidation catalyst converter 32 are provided to the exhaust pipe 24 in this order in a direction in which the exhaust gas flows. The continuously regenerating DPF device 26 includes: a diesel oxidation catalyst (DOC) converter 26A adapted to at least oxidize nitrogen monoxide (NO) to nitrogen dioxide ($NO_2$); and a DPF 26B adapted to collect and eliminate PM contained in the exhaust gas. In place of the DPF 26B, a catalyzed soot filter (CSF) on which surface a catalyst (active ingredients and addition ingredients) is supported may be used. In this exemplary embodiment, at least one of the DOC converter 26A, the DPF 26B, the SCR converter 30 and the oxidation catalyst converter 32, which are all provided to the exhaust pipe 24, serves as an exhaust purification element included in the exhaust purification apparatus.

The diesel engine 10 is attached with an exhaust gas recirculation (EGR) system 34 adapted to reduce $NO_x$ by introducing and recirculating a part of the exhaust gas in the intake air and by decreasing the combustion temperature. The EGR system 34 includes: an EGR pipe 34A adapted to introduce into the intake pipe 14 a part of the exhaust gas flowing in the exhaust pipe 24; an EGR cooler 34B adapted to cool the exhaust gas flowing in the EGR pipe 34A; and an EGR control valve 34C adapted to control an EGR rate at which the exhaust gas is introduced into the intake pipe 14.

As a control system for the exhaust purification apparatus, a temperature sensor 36 adapted to measure a temperature (exhaust temperature) $T_1$ of the exhaust gas flowing into the DOC converter 26A is provided at the exhaust upstream side of the DOC converter 26A of the continuously regenerating DPF device 26. Furthermore, a temperature sensor 38 adapted to measure a temperature (exhaust temperature) $T_2$ of the exhaust gas flowing into the DPF 26B is provided at a position between the DOC converter 26A and the DPF 26B of the continuously regenerating DPF device 26. A temperature sensor 40 adapted to measure a temperature (exhaust gas temperature) $T_3$ of the exhaust gas flowing into the SCR converter 30 and the oxidation catalyst converter 32 is provided at a position between the continuously regenerating DPF device 26 and the reducing agent injection device 28. In order to measure the exhaust gas temperature of the exhaust gas flowing into the oxidation catalyst converter 32, an additional temperature sensor may be provided between the SCR converter 30 and the oxidation catalyst converter 32.

The output signals respectively from the temperature sensors 36, 38 and 40 are input into a control unit 42 having a built-in computer. The control unit 42 is also input with the output signals respectively from a revolution speed sensor 44 for detecting a revolution speed Ne and a load sensor 46 for detecting a load Q, which are exemplary indication for the operation of the diesel engine 10. Examples of the load Q of the diesel engine 10 are properties closely associated with torque, such as a flow rate of the intake air, a pressure of the intake air, a supercharging pressure, an accelerator opening and a throttle opening. The revolution speed Ne and the load Q of the diesel engine 10 may be read from an engine control unit (not illustrated) adapted to electronically control the diesel engine 10 via a controller area network (CAN).

By running a control program stored in a nonvolatile memory such as a read only memory (ROM), the control unit 42 determines whether or not fuel components (e.g., sulfur components and HC components) have accumulated in the exhaust purification element in an amount that exceeds an allowable amount, based on the signals from the various sensors. When determining that the fuel components have accumulated in the exhaust purification element in the amount exceeding the allowable amount, the control unit 42 outputs a fuel increase command to a fuel injection device attached to the diesel engine 10 in order to forcefully remove the fuel components by raising the exhaust gas temperature. At such time, the control unit 42 also controls an alarming lamp 48 (alarm) attached to an instrument cluster to be lightened.

Figure 2:
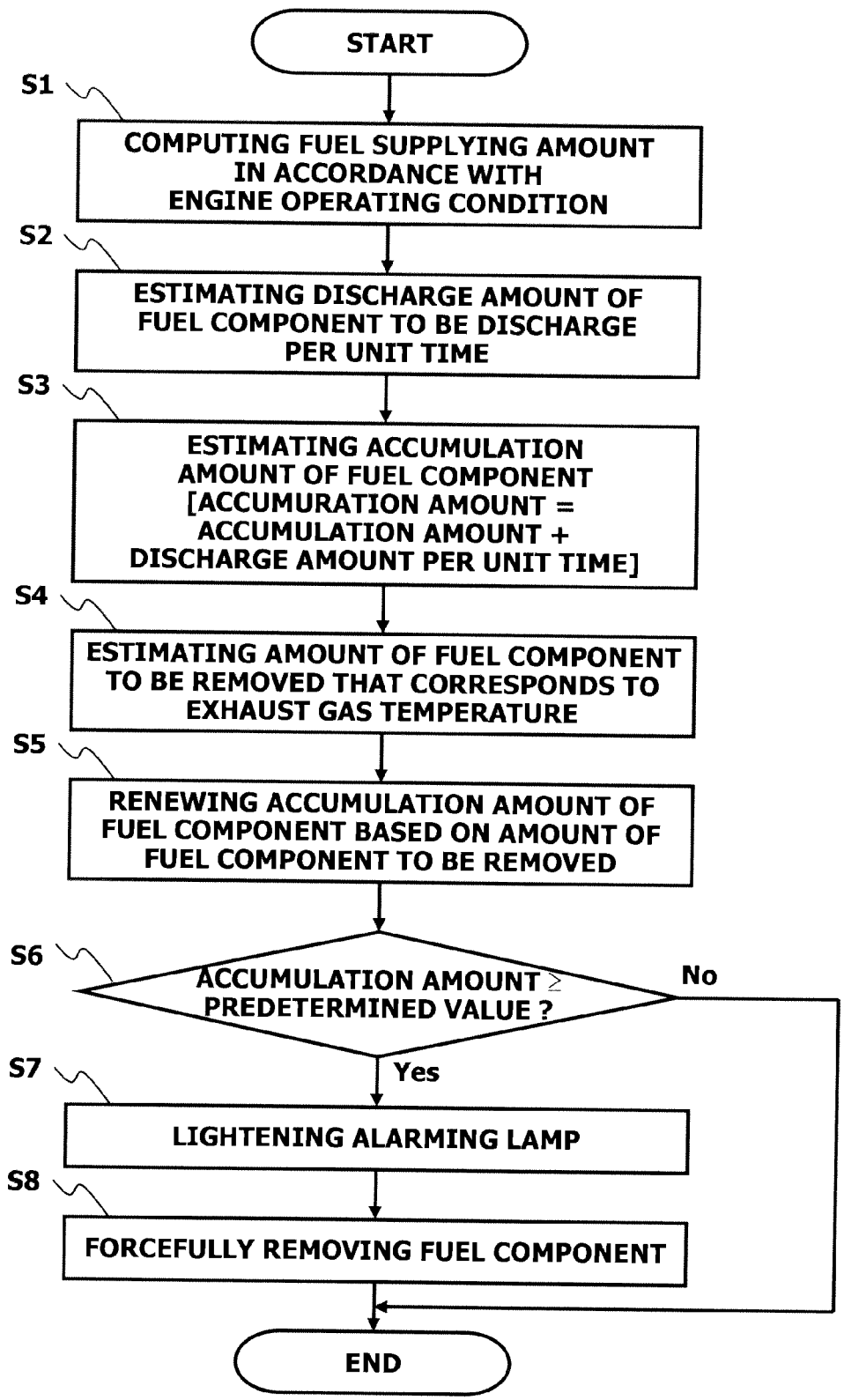
FIG. 2 is a flow chart illustrating an exemplary control program.

FIG. 2 illustrates the content of the control program that the control unit 42 repeatedly runs every unit time (e.g., every one second) upon the activation of the diesel engine 10. Incidentally, according to a control program that is different from the control program illustrated in FIG. 2, the control unit 42 electronically controls the reducing agent injection device 28 and the EGR control valve 34C in accordance with the engine operating condition and the like.

In step 1 (abbreviated as "S1" in the drawing, and same will be applied hereunder), the control unit 42 computes a fuel supplying amount to be fed per unit time in accordance with the engine operating condition. Specifically, the control unit 42, for instance, reads the load Q from the load sensor 46 and computes the fuel supplying amount corresponding to the load Q, based on a map that sets out the fuel supplying amounts corresponding to the loads. The fuel supplying amount may be read from the engine control unit (not illustrated).

In step 2, the control unit 42 estimates a discharge amount of a predetermined fuel component to be discharge per unit time, for instance, by multiplying the fuel supplying amount per unit time by the content percentage of the fuel component in the fuel. The content percentage of the fuel component may be, for instance, a fixed value corresponding to the fuel property.

In step 3, the control unit 42 estimates the accumulation amount of the fuel component accumulated in the target exhaust purification element (i.e., the DOC converter 26A, the DPF 26B, the SCR converter 30 or the oxidation catalyst converter 32), by utilizing a formula such as "accumulation amount=accumulation amount+discharge amount per unit time".

Figure 3:
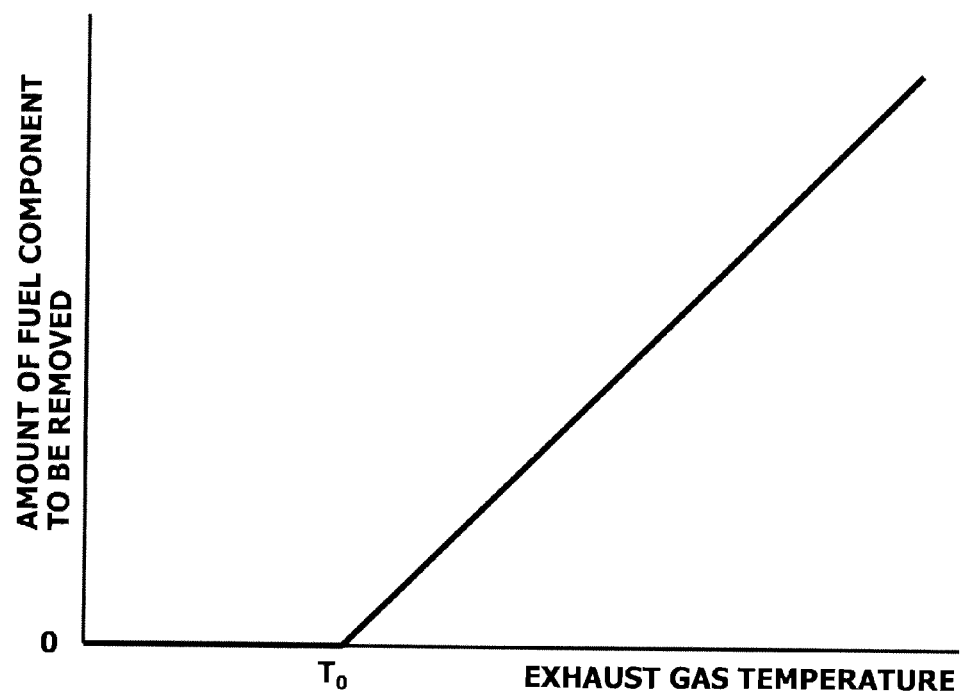
FIG. 3 is a view explaining a map for use in estimating an amount of a fuel component to be removed corresponding to an exhaust gas temperature.

In step 4, the control unit 42 estimates an amount of the fuel component to be removed, in accordance with the exhaust gas temperature $T_i$ (i=any one of 1 to 3) of the exhaust gas flowing into the target exhaust purification element, which is read from the temperature sensor 36, 38 or 40. In estimating, the control unit 42 refers to a map that sets out the amounts of the fuel component to be removed, corresponding the exhaust gas temperatures as illustrated in FIG. 3. In the map illustrated in FIG. 3, the amount of the fuel component to be removed is set to "zero," which means that no fuel component can be removed, in a region in which the exhaust gas temperature is lower than or equal to an temperature $T_0$ at which the fuel component is removed. The amount of the fuel component to be removed corresponding to the exhaust gas temperature may be obtained per target fuel component through, for example, simulations or experiments.

In step 5, the control unit 42 renews the accumulation amount of the fuel component accumulated in the target exhaust purification element based on the amount of the fuel component to be removed. In renewing, the control unit 42 utilizes a formula such as "accumulation amount=accumulation amount−to-be-removed amount".

In step 6, the control unit 42 determines whether or not the accumulation amount of the fuel component accumulated in the exhaust purification element is equal to or grater than a predetermined amount. The "predetermined amount" is a threshold for use in determining whether or not to forcefully remove the fuel component accumulated in the exhaust purification element. For instance, the predetermined amount is set to be slightly smaller than an allowable accumulation amount up to which the exhaust purification element is able to tolerate the accumulation of the fuel component. Then, when determining that the accumulation amount of the fuel component is equal to or greater than the predetermined amount, the control unit 42 proceeds the process to step 7 (Yes), but when determining that the accumulation amount of the fuel component is less than the predetermined amount, the control unit 42 terminates the process (No).

In step 7, in order to alarm that the fuel component accumulated in the exhaust purification element is being forcefully removed, the control unit 42 controls the alarming lamp 48 attached to the instrument cluster to be lightened. In place of the alarming lamp 48, another alarm such as a buzzer may be activated.

In step 8, in order to forcefully remove the fuel component accumulated in the exhaust purification element by raising the exhaust gas temperature above the temperature at which the fuel component is removed, the control unit 42 outputs a command for increasing the fuel supplying amount to the fuel injection device attached to the diesel engine 10. In order to raise the exhaust gas temperature, the control unit 42 may perform a known forceful removing processing such as a control to open or close an intake air shutter or an exhaust shutter, a vane opening control of a variable turbo charger or a post injection control.

In the above-described exhaust purification apparatus, the exhaust gas from the diesel engine 10 passes through the exhaust manifold 22 and the turbine 18B of the turbo charger 18 to be introduced into the DOC converter 26A of the continuously regenerating DPF device 26. The exhaust having been introduced into the DOC converter 26A flows into the DPF 26B while NO contained therein is being partially oxidized to $NO_2$. In the DPF 26B, the PM in the exhaust gas is collected and eliminated, and the PM is oxidized with use of the $NO_2$ generated by the DOC converter 26A. In this manner, the collecting and eliminating of the PM and the regenerating of the PM are simultaneously performed.

The urea aqueous solution injected and fed from the reducing agent injection device 28 in accordance with the engine operating condition is hydrolyzed with use of the exhaust gas heat and the vapor in the exhaust gas, and converted into ammonia to serve as the reducing agent. In the SCR converter 30, this ammonia causes a selective reduction reaction with $NO_x$ contained in the exhaust gas. As is known, the ammonia is then purified to be water ($H_2O$) and nitrogen gas ($N_2$), i.e., harmless components. On the other hand, the ammonia that has passed through the SCR converter 30 is to be oxidized by the oxidation catalyst converter 32 disposed at the exhaust downstream side of the SCR converter 30. Accordingly, the ammonia is prevented from being discharge into the atmosphere in its direct form.

According to the exhaust purification process described above, the accumulation amount of the fuel component accumulated in the target exhaust purification element is estimated by: sequentially integrating the discharge amount of the fuel component per unit time, which is estimated from the fuel supplying amount; and sequentially subtracting from the obtained integrated value the amount of the fuel component to be removed that corresponds to the exhaust gas temperature.

The fuel component accumulated in the target exhaust purification element decreases in the region in which the exhaust gas temperature is higher than the temperature at which the fuel component is removed. Thus, with the attentions paid to this characteristic, by taking into account not only the discharge amount of the fuel component but also the amount of the fuel component to be removed, the accumulation amount of the fuel component accumulated in the exhaust purification element is estimated with high precision. Then, when the accumulation amount of the fuel component is equal to or greater than the predetermined value, the alarming lamp 48 attached to the instrument cluster is lightened, and the fuel component is forcefully removed.

The accumulation amount of the fuel component accumulated in the exhaust purification element may be configured to be written by the control unit 42 into the nonvolatile memory at the time when the engine is stopped, and the accumulation amount of the fuel component may be configured to be read from the nonvolatile memory at the time when the engine is activated. With this arrangement, the accumulation amount of the fuel component is prevented from being reset when the engine is stopped, and the value having been thus far calculated is retained for the subsequent uses. Therefore, reduction in the precision for the estimation of the accumulation amount of the fuel component may be suppressed.

Furthermore, considering that the exhaust purification element is subjected to cleaning and the like at, for instance, maintenance factories, the exhaust purification apparatus may be configured to have a function that forcefully resets the accumulation amount of the fuel component in response to external instructions. Moreover, the forceful removing processing of the fuel component accumulated in the exhaust purification element may not be automatically performed, but may be instead configured to be performed in response to an instruction by a driver or the like who has noticed the lightening of the alarming lamp 48.

The invention is not only applicable to the exhaust purification apparatus of the diesel engine 10 but also applicable to three-way catalytic converters adapted to simultaneously purify CO, HC and NO contained in the exhaust gas of gasoline engines. In addition, the invention is not only applicable to the DOC converter 26A, the DPF 26B, the SCR converter 30, the oxidation catalyst converter 32 and the three-way catalyst converter, but also applicable to various exhaust purification elements provided to the exhaust pipe. Furthermore, a plurality of exhaust purification elements may be targeted in the invention.

REFERENCE SIGNS LIST 10 diesel engine
24 exhaust pipe
26 continuously regenerating DPF device
26A DOC converter
26B DPF
30 SCR converter
32 oxidation catalyst converter
36 temperature sensor
38 temperature sensor
40 temperature sensor
42 control unit
48 alarming lamp

The invention claimed is:
1. An exhaust purification apparatus for an engine, comprising:
an exhaust purification element provided to an exhaust pipe of the engine;

a temperature sensor adapted to measure a temperature of exhaust gas that flows into the exhaust purification element; and a control unit having a built-in computer, wherein the control unit is programmed to estimate a discharge amount of a predetermined fuel component to be discharged per unit time, the predetermined fuel component being contained in the exhaust gas, estimate an amount of the fuel component to be removed per unit time that corresponds to an exhaust gas temperature measured by the temperature sensor, by referencing to a map that sets out amounts of the fuel component to be removed per unit time corresponding to temperatures of the exhaust gas, wherein, in the map, an amount of the fuel component to be removed per unit time gradually increases as the exhaust gas temperature becomes higher than a temperature at which the fuel component is removed, and is set to zero in a region in which the exhaust gas temperature is lower than or equal to the temperature at which the fuel component is removed, and estimate an accumulation amount of the fuel component accumulated in the exhaust purification element, based on the discharge amount and the amount of the fuel component to be removed per unit time.

2. The exhaust purification apparatus for an engine, according to claim 1, wherein the control unit is further programmed to determine that a timing to forcefully remove the fuel component accumulated in the exhaust purification element has arrived, when the accumulation amount of the fuel component is equal to or greater than a predetermined value.

3. The exhaust purification apparatus for an engine, according to claim 2, wherein the control unit is further programmed to activate an alarm when determining that the timing to forcefully remove the fuel component has arrived.

4. The exhaust purification apparatus for an engine, according to claim 2, wherein the control unit is further programmed to perform a forceful removing processing when determining that the timing to forcefully remove the fuel component has arrived, the forceful removing processing including raising a temperature of the exhaust gas that flows into the exhaust purification element above the temperature at which the fuel component is removed.

5. The exhaust purification apparatus for an engine, according to claim 1, wherein the control unit is further pro rammed to write into a nonvolatile memory the accumulation amount of the fuel component when the engine is stopped, and read the accumulation amount of the fuel component from the nonvolatile memory when the engine is activated.

6. The exhaust purification apparatus for an engine, according to claim 1, wherein the control unit is further programmed to forcefully reset the accumulation amount of the fuel component in response to an external instruction.

7. The exhaust purification apparatus for an engine, according to claim 1, wherein the control unit is programmed to estimate the discharge amount of the fuel component per unit time, based on a fuel supplying amount per unit time and a content percentage of the fuel component in a fuel.

8. The exhaust purification apparatus for an engine, according to claim 1, wherein the control unit is programmed to estimate the accumulation amount of the fuel component by subtracting an integrated value obtained by sequentially integrating the amount of the fuel component to be removed per unit time from an integrated value obtained by sequentially integrating the discharge amount of the fuel component per unit time.

* * * * *